Reissued Apr. 23, 1940 Re. 21,432

UNITED STATES PATENT OFFICE 21,432

PROCESS AND COMPOUND FOR POLISHING PLASTICS

Joseph Lupo, Jr., New York, N. Y.

No Drawing. Original No. 2,062,671, dated December 1, 1936, Serial No. 9,691, March 6, 1935. Application for reissue October 6, 1938, Serial No. 233,698

7 Claims. (Cl. 51—306)

This invention relates to the art of finishing articles by imparting thereto a smooth lustrous surface and has particular reference to a process and compound for polishing plastics, such as made from phenol, Bakelite, catalin, Celluloid, marblette and the like.

The invention primarily comprehends a process for polishing plastics of the indicated character by tumbling the same in intimate association with a compound having a granular fibrous base which is coated with an abrasive bonded thereto by an unctuous vehicle and binder.

The invention more particularly contemplates a relatively dry compound for the indicated purpose, which includes a granular fibrous base impregnated by and coated with an oily vehicle and an abrasive uniformly covering the fibrous base and bonded thereto by the cohesive action of the vehicle and to a method of mixing the said compound.

The invention further includes a compound for finishing plastics of the indicated character, having roughened surfaces, which compound is effective in cutting off the roughened portions and producing a smooth lustrous surface, and which compound comprises a granular fibrous base impregnated by and coated with an unctuous vehicle and binder of creamy consistency including an oily body, and an abrasive coating bonded to the base by the cohesive action of the said vehicle.

The invention also includes a rapid polishing compound for producing a high luster on articles of the aforesaid character, which compound comprises fibrous pellets impregnated by and coated with an unctuous vehicle and binder of creamy consistency, including wax and oil, and an abrasive coating bonded to the base by the cohesive action of the said vehicle.

By utilizing compounds of the type specified, the process for polishing plastics of the said character is accomplished more economically and efficiently than heretofore, the process avoiding the raising of dust while a high degree of luster is imparted to the articles being treated in a minimum time and a water proof finish is obtained which precludes any possibility of and eliminates frosting of the plastics which has been a disadvantage incident to the usual wet process.

With the above and other objects in view, reference is now made to the following specification, in which there is disclosed the improved process and compounds, while the appended claims cover variations thereof which fall within the scope and spirit of the invention.

In carrying out the invention, use is made of a granular fibrous base which preferably consists of granulated cork or leather or fragments such as sawdust from which the finest dust particles have been removed or wood pellets such as shoe pegs which fragments readily absorb and take on a surface film or skin of a vehicle and binder which intimately bonds an abrasive to the surface thereof. Wood fragments, or an equivalent compressible or yieldable material, do not offer undue resistance to the plastics while the same are being polished and when subjected to heat, frictionally generated by the tumbling operation, a portion of the vehicle coated thereon is given off to thereby effect a lubrication of the plastics being polished.

In order to provide a relatively dry compound for finishing plastics in accordance with the process, the following ingredients, in approximately the proportions given, have been found to be efficient and economical.

| | Pounds |
|---|---|
| Wood fragments, such as sawdust, or granulated cork or leather | 16 |
| Mineral cutting oil | 2 |
| Powdered pumice | 4 |

The cutting oil used in this compound is a light lubricating mineral oil such as is used for flushing crank cases of motors or in screw machines and which has a specific gravity of 27.2 in units of American Petroleum Institute, flash at 395° F., and viscosity of 85 at 100° F.

The wood fragments are impregnated and coated with the cutting oil by spraying the oil thereupon, while the same are under agitation, in a mixing machine. From 3 to 5 minutes have been found sufficient to allow the oil to permeate the wood fragments, after which the powdered pumice is added to the oil saturated wood fragments and intimately mixed therewith for a period sufficient to effect uniform coating thereof upon the wood fragments which period has in practice been found to require approximately 20 minutes.

Plastic articles requiring a slight cutting down and a high luster may be effectively finished by employing, in the process, a compound which includes, as the abrasive, finely ground siliceous rock, together with a relatively soft fine powder and a vehicle including oil for bonding the abrasive to the wood fragments. The compound produces a permanent high luster and a waterproof finish. For this purpose the compound consists of the following ingredients, in approximately the proportions indicated:

45 lbs. of sawdust or granulated cork or leather;
18 lbs. of a vehicle consisting of and prepared by mixing:
60 lbs. degras
40 lbs. petrolatum.
5 lbs. red oil or oleic acid or any other fatty acid product
20 lbs. mineral cutting oil
50 lbs. chalk precipitated
16 lbs. double ground tripoli After the vehicle has been sprayed on the sawdust, so that the same is impregnated by and thoroughly coated therewith, 2 lbs. of double ground tripoli and 10 lbs. of chalk precipitated are sprinkled over the vehicle impregnated sawdust and intimately mixed therewith.

The said vehicle is prepared by mixing the said proportions of degras, petrolatum, red oil and cutting oil in a steam kettle and heating the same to approximately 150° so as to reduce the ingredients to a homogeneous mass after which the said proportions of chalk and tripoli are thoroughly mixed therewith. Eighteen lbs. of this vehicle is sprayed upon the sawdust, while the same is under agitation, in a tumbling barrel and when the sawdust is impregnated and thoroughly coated therewith, the additional quantity of tripoli and chalk is mixed therewith. This compound, after it has cooled, hardens and forms into lumps which, when agitated in the tumbling barrel with the plastic articles being finished, generates sufficient heat to cause some of the liquid, absorbed by the sawdust, to be given up to thereby effect a lubrication of the plastics being polished.

The said compound produces the highest luster obtainable by the tumbling method. This compound leaves a slightly oily film on the articles which is removed by treating the articles in a tumbling barrel with a polishing cream which consists of the following ingredients in substantially the proportions set forth.

| | Pounds |
|---|---|
| No. 1 yellow carnauba wax | 6 |
| Stearic acid | 6 |
| Spermaceti wax | 21 |
| White beeswax | 21 |
| Oil paraffin | 4 |
| Turpentine | 64 |
| Abrasive consisting of tripoli, carborundum and infusorial earth | 16 |

The said ingredients are intimately mixed in a steam jacket to produce a homogeneous creamy mass. A small quantity of this vehicle, approximately 4 ozs., intimately mixed with approximately 20 lbs. of shoe pegs in a tumbling barrel, has been found advantageous in producing a high luster. Articles which have been previously polished with either one or both of the previously described compounds may be polished in a tumbling barrel with a quantity of shoe pegs coated with the aforesaid cream for a period of one and one-half hours with the door of the barrel closed, and for an additional period of one-half hour with the screen door which permits cool air to circulate in the barrel so as to produce a hard finish.

In addition to producing a high luster on articles made of plastic material, metal articles may also be treated by utilizing the polishing cream in the said process to impart thereto a high finish or luster. Articles which are rough and require a considerable cutting down may be processed by tumbling the same in a mixture of the aforementioned compound, having a granular fibrous base of sawdust, and subsequently finished with the compound having a fibrous base consisting of shoe pegs coated with the said polishing cream.

Where an inexpensive article is to be treated in order to produce a cutting down and a slight luster imparted thereto, 70% of the first mentioned compound is mixed with 30% of the second mentioned compound and the articles treated in a tumbling barrel therewith. If a higher luster is desired, the articles may optionally be subsequently treated with the polishing cream.

What is claimed is:

1. A tumbling compound for finishing and polishing plastic articles including 16 parts by weight of wood fragments, 2 parts by weight of a light lubricating mineral oil, impregnating and coating the wood fragments and 4 parts by weight of powdered pumice adhesively bonded to the wood fragments by the cutting oil.

2. A tumbling compound for finishing and polishing plastic articles including 45 parts by weight of sawdust and 18 parts by weight of a vehicle coated upon the sawdust, said vehicle consisting of 60 parts by weight of degras, 40 parts by weight of petrolatum, 5 parts by weight of red oil, 20 parts by weight of a mineral cutting oil, 15 parts by weight of chalk precipitated and 16 parts by weight of ground tripoli.

3. A tumbling compound for polishing plastic articles including approximately 20 parts by weight of shoe pegs and approximately .25 parts by weight of a cream coated upon the shoe pegs, said cream consisting of 6 parts by weight yellow carnauba wax, 6 parts by weight of stearic acid, 21 parts by weight spermaceti wax, 21 parts by weight white beeswax, 4 parts by weight oil paraffin, 64 parts by weight turpentine and 16 parts by weight abrasive consisting of tripoli, carborundum and infusorial earth.

4. The process for finishing and polishing plastic articles made of plastic material which consists in abrading the same with an abrasive material consisting of a granular fibrous base impregnated by and coated with a vehicle including a light lubricating mineral oil and having a surface coating of a powdered abrasive adhesively bonded thereto by the vehicle.

5. The process for finishing and polishing plastic articles made of plastic material which consists in abrading the same with an abrasive material consisting of a granular fibrous base impregnated by and coated with a vehicle including degras, petrolatum and a mineral cutting oil and having a surface coating of a powdered abrasive adhesively bonded thereto by the vehicle.

6. The process for finishing and polishing plastic articles made of plastic material which consists in abrading the same with an abrasive material consisting of a granular fibrous base impregnated by and coated with a vehicle including degras, petrolatum and a mineral cutting oil and having a surface coating of chalk precipitated and tripoli adhesively bonded thereto by the vehicle.

7. A tumbling compound for finishing and polishing articles, said compound including wood fragments, a light lubricating mineral oil impregnating and coating the wood fragments, and a powdered abrasive adhesively bonded to the wood fragments by the mineral oil.

JOSEPH LUPO, JR.